US012662381B2

(12) United States Patent
Megido Fernandez et al.

(10) Patent No.: US 12,662,381 B2
(45) Date of Patent: Jun. 23, 2026

(54) METHOD FOR THE MANUFACTURE OF A SELF-STANDING GRAPHENE OXIDE OR REDUCED GRAPHENE OXIDE FILM

(71) Applicant: ArcelorMittal, Luxembourg (LU)

(72) Inventors: Laura Megido Fernandez, Gijon Asturias (ES); Cristina Botas Velasco, Oviedo Asturias (ES); Thi Tan Vu, Oviedo (ES); Roberto Suarez Sanchez, Avilés Asturias (ES)

(73) Assignee: ArcelorMittal, Luxembourg (LU)

( * ) Notice: Subject to any disclaimer, the term of this patent is extended or adjusted under 35 U.S.C. 154(b) by 401 days.

(21) Appl. No.: 18/036,972

(22) PCT Filed: Nov. 18, 2020

(86) PCT No.: PCT/IB2020/060848
§ 371 (c)(1),
(2) Date: May 15, 2023

(87) PCT Pub. No.: WO2022/106866
PCT Pub. Date: May 27, 2022

(65) Prior Publication Data
US 2024/0018004 A1     Jan. 18, 2024

(51) Int. Cl.
*C01B 32/198* (2017.01)
*C01B 32/194* (2017.01)

(52) U.S. Cl.
CPC .......... *C01B 32/198* (2017.08); *C01B 32/194* (2017.08)

(58) Field of Classification Search
CPC .......................... C01B 32/194; C01B 32/198
See application file for complete search history.

(56) References Cited

U.S. PATENT DOCUMENTS

| | | | |
|---|---|---|---|
| 2013/0314844 A1 * | 11/2013 | Chen ..................... | C01B 32/198 |
| | | | 361/502 |
| 2017/0021387 A1 | 1/2017 | Lin et al. | |
| 2017/0057812 A1 | 3/2017 | Zurutuza et al. | |
| 2017/0106342 A1 | 4/2017 | Raveendran-Nair et al. | |
| 2018/0009676 A1 | 1/2018 | Pickett et al. | |
| 2018/0134561 A1 | 5/2018 | Yanase et al. | |
| 2018/0339906 A1 | 11/2018 | Lu et al. | |
| 2020/0231444 A1 | 7/2020 | Gao et al. | |

FOREIGN PATENT DOCUMENTS

| | | |
|---|---|---|
| CN | 103232033 A | 8/2013 |
| CN | 103449420 A | 12/2013 |
| CN | 104192833 A | 12/2014 |
| CN | 108310948 A | 7/2018 |
| JP | 2018077412 A | 5/2018 |
| WO | WO2017014899 | 1/2017 |
| WO | WO2019071943 | 4/2019 |
| WO | WO2020201876 A1 | 10/2020 |

OTHER PUBLICATIONS

Search Report of PCT/IB2020/060815 of Oct. 8, 2021 and International Report on Patentability.
L. Torrisi et Al :"Self-supporting graphene oxide films preparation and characterization methods", Vacuum 160 (2019) 1-11,.
Jin Shuangling et al, "Effects of reduction methods on the structure and thermal conductivity of free-standing reduced graphene oxide films", Diamond and Related Materials, NL, (Sep. 1, 2015), vol. 58, doi:10.1016/j.diamond.2015.06.005, ISSN 0925-9635, pp. 54-61.
Gascho Julia L. S. et al., "Graphene Oxide Films Obtained by Vacuum Filtration: X-Ray Diffraction Evidence of Crystalline Reorganization", Journal of Nanomaterials, US, vol. 2019, doi: 10.1155/2019/5963148, ISSN 1687-4110, (Mar. 24, 2019), pp. 1-12, URL: https://downloads.hindawi.com/journals/jnm/2019/5963148.pdf.
Ji Won SUK et al., ""Transfer of CVD-Grown Monolayer Graphene onto Arbitrary Substrates"", ACS Nano, (Sep. 6, 2011), vol. 5, No. 9, ISSN 0005362770, pp. 6916-6924.
Guan, KC, et al., "Spray-evaporation assembled graphene oxide membranes for selective hydrogen transport", (Separation and Purification Technology) , (Mar. 1, 2017).
Lu et al.: "Study on the Preparation of Graphene Thin Films by the RF-PECD Method and Their Properties," Zhengzhou University Master's Thesis, (Nov. 15, 2017) ; pp. 19 to 20, 23.

* cited by examiner

*Primary Examiner* — Stuart L Hendrickson
(74) *Attorney, Agent, or Firm* — Davidson Kappel LLC

(57)     ABSTRACT
A method for the manufacture of a self-standing graphene oxide or reduced graphene oxide film having a thickness between 0.4 and 4.0 µm, including the successive steps of A) preparing an aqueous dispersion including 0.1 to 30 g·L$^{-1}$ of graphene oxide or reduced graphene oxide, B) depositing the aqueous dispersion on a flat substrate coated with a polymeric film dissolvable in organic solvents and unsolvable in water, so as to form a wet film having a thickness comprised between 1 µm and 3.5 mm, C) drying the wet film, D) separating the polymeric film from the flat substrate, E) placing the polymeric film in a support frame, F) showering the polymeric film with an organic solvent to dissolve the polymeric film, G) separating the graphene oxide or reduced graphene oxide film from the frame to obtain the self-standing graphene oxide or reduced graphene oxide film.

15 Claims, 2 Drawing Sheets

METHOD FOR THE MANUFACTURE OF A SELF-STANDING GRAPHENE OXIDE OR REDUCED GRAPHENE OXIDE FILM

The present invention relates to a method for the manufacture of thin self-standing graphene oxide or reduced graphene oxide films. It is particularly well suited for electronic industry, nuclear industry, medical applications, energy industry, oil and gas industries, water treatment applications, chemistry industry or steelmaking.

BACKGROUND

It is known to produce carbon films which are thin film coatings which consist predominantly of the chemical element carbon. They include plasma polymer films, amorphous carbon films (diamond-like carbon, DLC), CVD diamond films as well as graphite films.

Usually, carbon films are produced by chemical vapor deposition (CVD) or physical vapor deposition (PVD). They are deposited in the form of thin films with film thicknesses of just a few micrometers.

It is also known from the paper "Self-supporting graphene oxide films preparation and characterization methods", L. Torrisi et Al, Vacuum 160 (2019) 1-11, to prepare a self-standing graphene oxide film by depositing a graphene oxide water dispersion on a substrate constituted of poly-tetra-fluoro-ethylene or of polycarbonated polymers, by drying the film and then by immersing the coated substrate in acetone to detach the graphene oxide film and make it float.

SUMMARY OF THE INVENTION

However, it is very difficult to pull the film off the acetone bath and the film tends to wrinkle or even to break. This limits the size of the film to a few millimeters.

An object of the present invention is to propose a method for the manufacture of thin self-standing graphene oxide or reduced graphene oxide films which makes it possible to easily obtain larger films.

For this purpose, a first subject of the present invention consists of a method for the manufacture of a self-standing graphene oxide or reduced graphene oxide film having a thickness between 0.4 and 4.0 $\mu$m, comprising the successive following steps:

A. The preparation of an aqueous dispersion comprising 0.1 to 30 g·L$^{-1}$ of graphene oxide or reduced graphene oxide, B. The deposition of the aqueous dispersion on a flat substrate coated with a polymeric film dissolvable in organic solvents and unsolvable in water, so as to form a wet film having a thickness comprised between 1 $\mu$m and 3.5 mm, C. The drying of the wet film to form a graphene oxide or reduced graphene oxide film on the polymeric film, D. The separation of the polymeric film coated with the graphene oxide or reduced graphene oxide film from the flat substrate, E. The placing of the polymeric film coated with the graphene oxide or reduced graphene oxide film in a support frame, F. The showering of the polymeric film with an organic solvent to dissolve the polymeric film and to obtain a framed graphene oxide or reduced graphene oxide film.

G. The separation of the graphene oxide or reduced graphene oxide film from the frame to obtain the self-standing graphene oxide or reduced graphene oxide film.

The method according to the invention may also have the optional features listed below, considered individually or in combination:

the graphene oxide, respectively the reduced graphene oxide, is in the form of nanoplatelets with a thickness comprised between 0.9 nm and 10 nm, respectively between 0.3 nm and 5 nm, the graphene oxide contains between 30 and 60% by weight of oxygen, the reduced graphene oxide contains less than 30% by weight of oxygen, the aqueous dispersion of step A comprises 0.5 to 15 g·L$^{-1}$ of graphene oxide or reduced graphene oxide and the wet film of step B has a thickness comprised between 1.0 $\mu$m and 2.5 mm, the flat substrate is a glass substrate, a metallic substrate, a ceramic substrate or a plastic substrate, the polymeric film is chosen from polyacrylates, polyvinyl esters, polyvinyl alcohol, polyurethanes or a mixture thereof, the drying of step C is performed at a temperature below 150° C. during 1 to 100 minutes, the separation of step D is performed by peeling off the polymeric film coated with the graphene oxide or reduced graphene oxide film from the flat substrate, the peeling off is done by wetting the interface between the polymeric film and the substrate, the support frame is located on the edges of the graphene oxide or reduced graphene oxide film, the organic solvent of step F is chosen from among acetone, ethanol, isopropanol or a mixture thereof, the aqueous dispersion of step A comprises graphene oxide and the self-standing graphene oxide film is transparent.

the self-standing graphene oxide or reduced graphene oxide film has a thickness between 0.7 and 2.5 $\mu$m, the self-standing graphene oxide or reduced graphene oxide film has a length between 5 and 500 mm and a width between 5 and 500 mm, the self-standing graphene oxide or reduced graphene oxide film has an areal density comprised between 0.01 and 20 g·m$^{-2}$, the method further comprising a step H during which the graphene oxide of the self-standing graphene oxide film, respectively the reduced graphene oxide of the self-standing reduced graphene oxide film, is reduced to obtain a self-standing reduced graphene oxide film, respectively further reduced.

BRIEF DESCRIPTION OF THE DRAWINGS

Other characteristics and advantages of the invention will be described in greater detail in the following description.

The invention will be better understood by reading the following description, which is provided purely for purposes of explanation and is in no way intended to be restrictive, with reference to.

DETAILED DESCRIPTION

In the following description, the term "(reduced) graphene oxide" indifferently refers to graphene oxide or reduced graphene oxide.

Without willing to be bound by any theory, it is believed that the method according to the present invention allows the production of large self-standing (reduced) graphene oxide films having a specific thickness and a high quality.

In a first step of the method (step A), an aqueous mixture is prepared by dispersing 0.1 to 30 g·L$^{-1}$ of (reduced) graphene oxide in water.

The graphene oxide contains between 30 and 60% by weight of oxygen. Thanks to the oxygen functional groups (e.g. carboxyl (—COOH), carbonyl (—C=O) and hydroxyl (—OH) groups) corresponding to this oxygen content, the graphene oxide can be easily dispersed in water. Moreover, the functional groups containing oxygen help creating the film thanks to the interactions between the functional groups of adjacent graphene oxide sheets.

The reduced graphene oxide contains less than 30% by weight of oxygen. Thanks to the reduction in oxygen content, electrical and thermal conductivities of the self-standing film are further improved.

Figure 1:
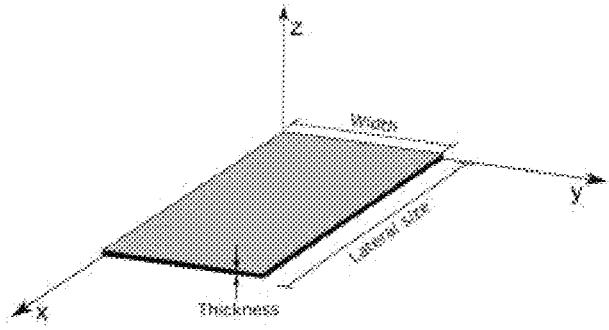
FIG. 1, which illustrates an example of a nanoplatelet of (reduced) graphene oxide according to the present invention, FIG. 2, which illustrates a flat substrate coated with a polymeric film and a (reduced) graphene oxide film according to the present invention, FIG. 3, which illustrates the polymeric film coated with the (reduced) graphene oxide film according to the present invention, after removal of the substrate, FIG. 4, which illustrates a self-standing (reduced) graphene oxide film obtained by the method according to the present invention.

Preferably, the (reduced) graphene oxide has a form of nanoplatelet, i.e. a nano-object with one external dimension in the nanoscale and the other two external dimensions significantly larger and not necessarily in the nanoscale. FIG. 1 illustrates an example of (reduced) graphene oxide flake according to the present invention. In this example, the lateral size means the highest length of the (reduced) graphene oxide through the X axis and the thickness means the height of the (reduced) graphene oxide through the Z axis. The width of the nanoplatelet is illustrated through the Y axis.

Advantageously, the (reduced) graphene oxide nanoplatelet has a lateral size between 0.1 and 100 μm and more preferably between 0.5 and 20 μm.

Preferably, the width size of the (reduced) graphene oxide nanoplatelet is between 0.1 nm and 100 μm.

Advantageously, the thickness of the graphene oxide nanoplatelet is between 0.9 nm and 10 nm. Advantageously, the thickness of the reduced graphene oxide nanoplatelet is between 0.3 nm and 5 nm.

Such dimensions favor the formation of films with a thickness below 4 μm.

The concentration of (reduced) graphene oxide in the aqueous dispersion is preferably from 0.1 to 20 g·L$^{-1}$ and advantageously from 0.5 to 15 g·L$^{-1}$. Such concentrations favor the formation of films with a thickness below 4 μm.

According to one variant, the aqueous mixture consists of (reduced) graphene oxide and water. According to another variant, the aqueous mixture contains additional compounds such as nanoparticles, surfactants or dispersing agents. Nanoparticles of several types (such as notably ceramic, metals, metal oxides, salts, organic compounds) can notably be added to the aqueous mixture to add new or improved performances to the self-standing (reduced) graphene oxide film. For electrochemical applications, for example Pt, Au, Ru, TiO$_2$, ZnO, SnO$_2$, Cu$_2$O, MnO$_2$, Mn$_3$O$_4$, NiO and SiO$_2$ can be added. Surfactants can be added to the dispersion in water notably when reduced graphene oxide and/or nanoparticles are added. Examples of possible surfactants/dispersing agents are: Sodium dodecyl benzene sulfonate (SDBS), DISPERBYK®-2010 supplied by BYK® and which is an aqueous emulsion of a structured acrylate copolymer with pigment-affinic groups, DISPERBYK®-2012 supplied by BYK® and which is a solution of a copolymer with pigment-affinic groups.

Preferably, the aqueous mixture doesn't comprise any binder. It is indeed preferable not to modify the film structure with a binder, notably for applications where the properties of carbon films are sought. Binders can notably alter the electrical and thermal conductivities.

Optionally the aqueous dispersion is mixed to improve the dispersion of (reduced) graphene oxide and optional compounds in water. The mixing can be done by mechanical agitation, ultrasound bath, high-shear mixing. It is particularly preferred when the aqueous dispersion is prepared with reduced graphene oxide comprising less than 20% by weight of oxygen.

In a second step of the method (step B), the aqueous dispersion is deposited on a flat substrate coated with a polymeric film dissolvable in organic solvents so as to form a wet film having a thickness comprised between 1.0 μm and 3.5 mm. The aqueous dispersion covers at least partially the flat substrate.

Thanks to wet films of such thicknesses formed from aqueous dispersions comprising 0.1 to 30 g·L$^{-1}$ of (reduced) graphene oxide, self-standing (reduced) graphene oxide films with a thickness between 0.4 and 4.0 μm can be obtained.

Preferably, a wet film having a thickness comprised between 1.0 μm and 2.5 mm is formed from an aqueous dispersion comprising 0.5 to 15 g·L$^{-1}$ of (reduced) graphene oxide so that self-standing (reduced) graphene oxide films with a thickness between 0.4 and 4.0 μm can be obtained.

Preferably, a wet film having a thickness comprised between 50 μm and 400 μm is formed from an aqueous dispersion comprising 1 to 10 g·L$^{-1}$ of (reduced) graphene oxide so that self-standing (reduced) graphene oxide films with a thickness between 0.6 and 3.0 μm can be obtained.

The substrate is flat, i.e. it has a level surface without raised areas or indentations. Preferably, the flat substrate is a glass substrate, a metallic substrate, a ceramic substrate or a plastic substrate.

The substrate is coated with a polymeric film, i.e. it is at least partially covered with a polymeric film. The nature of the bonding between the substrate and the polymeric film is not particularly limited. It can notably be a chemical bonding or a physical bonding. According to one preferred variant of the invention, water is used for the bonding. Either the polymeric film is wetted or the substrate is wetted before the polymeric film is applied on top of the substrate. The polymeric film is then preferably pressed against the substrate with a squeegee to remove wrinkles and air bubbles. Once the interface has dried, the polymeric film is sufficiently adherent to the substrate to use the coated substrate as support for the aqueous dispersion.

The polymeric film is dissolvable in organic solvents but unsolvable in water, so that it is compatible with the aqueous dispersion. It is preferably a thermoplastic. Preferably, the polymeric film is chosen from: polyacrylates, (e.g., poly (methyl-methacrylate), poly(ethyl methacrylate), poly (propyl methacrylate), poly(isobutyl methacrylate)), polyvinyl esters, polyvinyl alcohol, polyurethanes or a mixture thereof.

The polymeric film has preferably a thickness comprised between 5 and 100 μm, more preferably between 15 and 50

μm, which represents a good compromise between its ease to dissolve and its ability to support the (reduced) graphene oxide film.

Preferably, the aqueous dispersion is deposited by spraying, roll-coating, brushing, screen printing, dip coating, spin coating, doctor blade, bar coating or drop casting.

In a third step of the method (step C), the wet film of aqueous dispersion is dried so as to form a (reduced) graphene oxide film on the polymeric film.

According to one variant, the wet film is left to dry in the air.

In a preferred variant, the coating is forced-dried, i.e. is actively dried as opposed to a natural drying in the air. It is believed that the forced-drying favors the formation of a more homogeneous (reduced) graphene oxide film since the removal of water is better controlled. In a preferred variant, the drying is performed at a temperature below 150° C., more preferably between 50 and 150° C. and advantageously between 80 and 120° C. The drying can be performed with forced air, inert gas ($N_2$ or Ar) or under vacuum.

Advantageously, the drying is performed during 1 to 100 minutes and for example, between 10 and 60 minutes.

Figure 2:
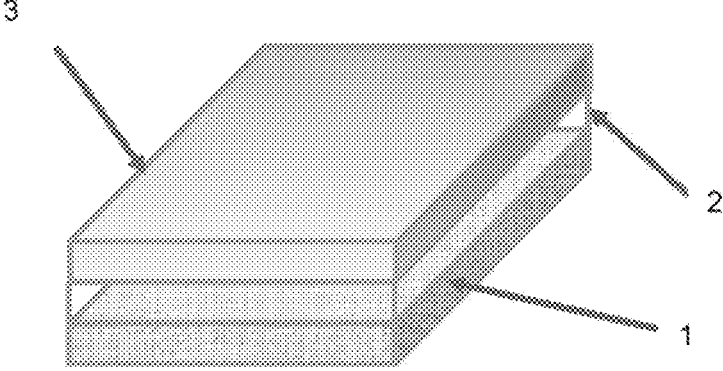

As illustrated in FIG. 2, after the drying, the substrate 1 is coated with the polymeric film 2 and the (reduced) graphene oxide film 3. In particular, the (reduced) graphene oxide film has a thickness comprised between 0.4 and 4.0 μm.

In a fourth step of the method (step D), the polymeric film coated with the (reduced) graphene oxide film is separated from the flat substrate.

The separation is performed by peeling off the polymeric film coated with the (reduced) graphene oxide film from the flat substrate. This can be performed in different ways depending on the nature of the polymer and the way it is adhering on the substrate. According to one preferred variant of the invention where the polymeric film is adhering on the substrate after having been wetted, the polymeric film is separated from the substrate by wetting the interface between the polymeric film and the substrate. In particular, water can be added close to the edges of the polymeric film so that the edges detach from the substrate.

Figure 3:
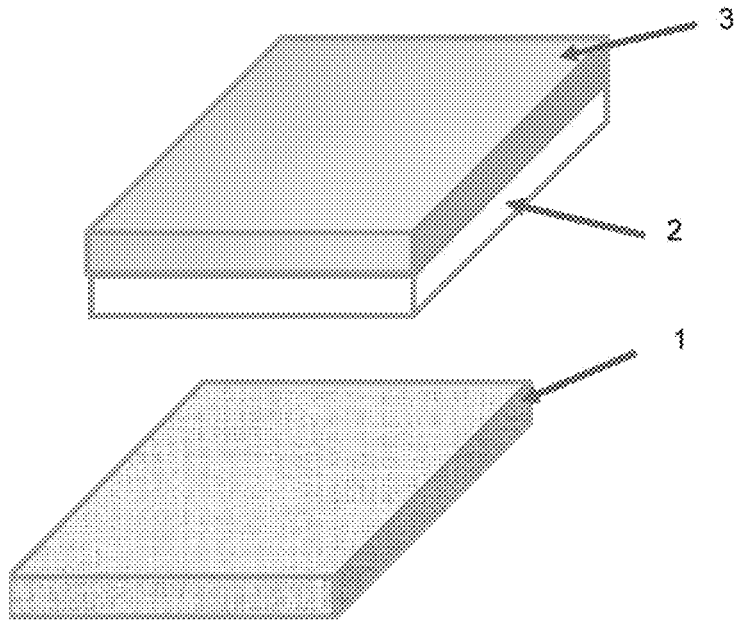

As illustrated in FIG. 3, after step D, the (reduced) graphene oxide film 3 remains on the polymeric film 2.

In a fifth step of the method (step E), the polymeric film coated with the (reduced) graphene oxide film is placed in a support frame to maintain the films in place and facilitate the dissolution of the polymeric film.

The support frame is preferably located on the edges of the (reduced) graphene oxide film, whose edges can merge with the edges of the polymeric film. The edges are thus well maintained and the polymeric film is level and tight.

To do so, the polymeric film can be optionally cut at the size of the support frame.

In a sixth step of the method (step F), the polymeric film is dissolved with an organic solvent by showering the polymeric film. It goes without saying that the showering is done on the surface of the polymeric film not coated with the (reduced) graphene oxide film. Thanks to the showering, the polymeric film is carefully removed without exposing the (reduced) graphene oxide film to the organic solvent. Moreover, the showering limits the quantity of solvent compared to a method where the polymeric film would be immersed in a solvent bath. In addition, the solvent evaporates at air, without forced drying or heating and the self-standing (reduced) graphene oxide film is directly obtained.

Preferably, the organic solvent is an alcohol or a ketone. For example, the organic solvent is chosen from among: acetone, ethanol, isopropanol or a mixture thereof.

The showering preferably last from 1 to 20 minutes.

Figure 4:
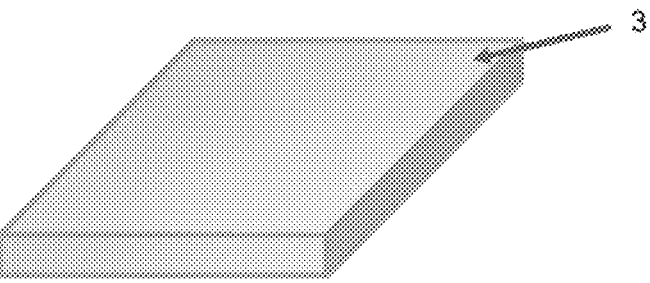

As illustrated in FIG. 4, after the dissolution of the polymeric film, a framed (reduced) graphene oxide film according to the present invention is obtained.

In a seventh step of the method (step G), the (reduced) graphene oxide film is separated from the frame to obtain the self-standing (reduced) graphene oxide film.

It can be done by removing the support frame or by cutting the (reduced) graphene oxide film.

This self-standing (reduced) graphene oxide film has a thickness between 0.4 and 4.0 μm. In the case of the graphene oxide, the latter comprises from 30 to 60% by weight of oxygen. In the case of reduced graphene oxide, the latter comprises less than 30% by weight of oxygen.

Without willing to be bound by any theory, it seems that this self-standing (reduced) graphene oxide film has a high quality. Indeed, it is believed that this (reduced) graphene oxide film has no cracks and is uniform. Moreover, it is believed that the (reduced) graphene oxide dispersion in the film is homogeneous thanks to the method according to the present invention. Finally, it is believed that this self-standing (reduced) graphene oxide layer is more mechanically resistant compared to the prior art.

When the thickness of the self-standing (reduced) graphene oxide film is below 0.4 μm, it is believed that the film is very fragile. Indeed, there is a risk that the film breaks. When the thickness of the self-standing (reduced) graphene oxide film is above 4.0 μm, it is believed that the (reduced) graphene oxide film is too thick for some purposes.

Preferably, the thickness is between 0.4 and 3.5 μm, more preferably between 0.6 and 3.0 μm, advantageously between 0.7 and 2.5 μm.

Preferably, the self-standing (reduced) graphene oxide film has a length between 5 and 500 mm and a width between 5 and 500 nm.

Preferably, the self-standing (reduced) graphene oxide film is binder-free.

According to one variant, the film consists of (reduced) graphene oxide. According to another variant, the film contains additional compounds such as nanoparticles, surfactants or dispersing agents, as described above.

Thanks to the method according to the invention, the surface density of the self-standing (reduced) graphene oxide film is between 0.01 and 20 $g \cdot m^{-2}$, more preferably between 0.05 and 15 $g \cdot m^{-2}$ and advantageously between 0.1 and 6 $g \cdot m^{-2}$. It is believed that this specific surface density further improves the properties of the self-standing (reduced) graphene oxide film.

In the case of graphene oxide, thanks to its thickness, its composition and its manufacturing process, the self-standing graphene oxide film has the additional advantage of being transparent in the visible spectrum, which makes it suitable for applications where the transparency is sought.

The method can optionally comprise an eighth step (step H) during which:

the graphene oxide of the self-standing graphene oxide film is reduced so as to obtain a self-standing reduced graphene oxide film, or the reduced graphene oxide of the self-standing reduced graphene oxide film is further reduced.

The methods to reduce graphene oxide are well known.

Depending on the process conditions, the final oxygen content in the reduced graphene oxide can vary between 0.1 and 25% in weight. Otherwise, step H doesn't modify the other properties of the self-standing film described above.

According to a first variant of step H, the self-standing (reduced) graphene oxide film is heated at a temperature above 150° C. (and up to 3000° C.) in inert atmosphere, reducing atmosphere (e.g. Argon/Hydrogen 95:5% v/v.) or under vacuum. The thermal treatment preferably lasts from 10 minutes to 2 hours. In this variant, the (reduced) graphene oxide film is preferably placed between two rigid pieces to avoid the formation of wrinkles during the heating treatment and to keep the film flat. The pieces can notably be made of graphite or alumina.

According to a second variant of step H, the (reduced) graphene oxide can be reduced with chemical reagents like hydrazine vapor or hydroiodic acid at room temperature or by moderate heating.

Finally, the invention relates to the use of the self-standing (reduced) graphene oxide film according to the present invention for the manufacture of electronic device, power generation device, heat exchanger block for chemical process plant and arc furnace electrode.

The invention will now be explained in trials carried out for information only. They are not limiting.

Examples

For Trial 1, graphene oxide in powder was pressed until obtaining a film. The graphene oxide has an oxygen content of 45% by weight.

For Trial 2, a poly(isobutylmethacrylate) film was first wetted with water and applied on a flat glass substrate and let to dry.

A dispersion comprising 5 g·L$^{-1}$ of graphene oxide having an oxygen content of 45% by weight in water was then prepared. The dispersion was deposited on the flat glass substrate coated with poly(isobutylmethacrylate) by doctor Blade to obtain a wet film having a thickness of 100 μm. The wet film was then dried at a temperature of 80° C. for 20 minutes. After drying, the poly(isobutylmethacrylate) film coated with the graphene oxide film was peeled off from the flat substrate by inserting water between the substrate and the polymeric film. The polymer coated with graphene oxide was placed in a support frame. Then, acetone was showered on the polymeric film for 5 minutes to dissolve the polymeric film and to obtain the graphene oxide film. The graphene oxide film was then removed from the support frame.

For Trial 3, a poly(isobutylmethacrylate) film was first wetted with water and applied on a flat glass substrate and let to dry.

A dispersion comprising 5 g·L$^{-1}$ of graphene oxide having an oxygen content of 45% by weight in water was then prepared. The dispersion was deposited on the flat glass substrate coated with poly(isobutylmethacrylate) by doctor Blade to obtain a wet film having a thickness of 200 μm. The wet film was then dried at a temperature of 80° C. for 20 minutes. After drying, the poly(isobutylmethacrylate) film coated with the graphene oxide film was peeled off from the flat substrate by inserting water between the substrate and the polymeric film. The polymer coated with graphene oxide was placed in a support frame. Then, acetone was showered on the polymeric film for 5 minutes to dissolve the polymeric film and to obtain the graphene oxide film. The graphene oxide film was then removed from the support frame.

For Trial 4, the self-standing graphene oxide film obtained by the method of Trial 2 was further reduced by placing it between 2 pieces of graphite in an oven in vacuum conditions (P<40 mbar) at 300° C. for 1 h.

For Trial 5, the self-standing graphene oxide film obtained by the method of Trial 2 was further reduced by placing it between 2 pieces of graphite in an oven at 900° C. under N$_2$ atmosphere for 1 h.

For Trial 6, a poly(isobutylmethacrylate) film was first wetted with water and applied on a flat glass substrate and let to dry.

An aqueous dispersion comprising 5 g·L$^{-1}$ of reduced graphene oxide (17% wt. oxygen content) and DIS-PERBYK®-2010 0.1% by volume of the volume of the aqueous dispersion was then prepared using a high-shear mixer (6000 rpm for 1 h). The dispersion was deposited on the flat glass substrate coated with poly(isobutylmethacrylate) by doctor Blade to obtain a wet film having a thickness of 200 μm. The wet film was then dried at a temperature of 80° C. for 20 minutes. After drying, the poly(isobutylmethacrylate) film coated with the reduced graphene oxide film was peeled off from the flat substrate by inserting water between the substrate and the polymeric film. The polymer coated with reduced graphene oxide was placed in a support frame. Then, acetone was showered on the polymeric film for 5 minutes to dissolve the polymeric film and to obtain the reduced graphene oxide film. The reduced graphene oxide film was then removed from the support frame.

The percentage of oxygen in the (reduced) graphene oxide of the film was measured by thermogravimetric analysis, thermal programmed desorption and X-ray photoelectron spectroscopy. The thickness of the film was measured by Atomic Force Microscope, Scanning Electron Microscopy, Transmission electron microscopy and micrometer. The areal density of the graphene oxide film was measured with a precision analytical balance. The transmittance measurements were done using the equipment Haze-gard i from BYK-Gardner in the Visible range following ASTM D1003.

The results are in the following Table 1:

| Trials | Oxygen % in GO | Film thickness (μm) | Areal density (g · m$^{-2}$) | Visual aspect | Transmittance (%) |
|---|---|---|---|---|---|
| 1 | 45 | 10.0 μm ± 10% | 19.0 | Not transparent | <5% |
| 2* | 45 | 1.0 μm ± 10% | 2.0 | Transparent | >35% |
| 3* | 45 | 2.2 μm ± 10% | 4.0 | Not transparent | <20% |
| 4* | 22 | 1.5 μm ± 10% | 3.0 | Not transparent | <5% |
| 5* | 2 | 1.0 μm ± 10% | 2.0 | Not transparent | <5% |
| 6* | 17 | 1.4 μm ± 10% | 2.8 | Not transparent | <10% |

*according to the present invention.

Trials according to the present invention showed a self-standing (reduced) graphene oxide film having an excellent quality.

What is claimed is:

1. A method for the manufacture of a self-standing graphene oxide or reduced graphene oxide film having a thickness between 0.4 and 4.0 μm, the method comprising the successive following steps:
   A. preparing an aqueous dispersion including 0.1 to 30 g·L$^{-1}$ of graphene oxide or reduced graphene oxide;
   B. depositing the aqueous dispersion on a flat substrate coated with a polymeric film dissolvable in organic solvents and unsolvable in water, so as to form a wet film having a thickness between 1 μm and 3.5 mm;

C. drying the wet film to form a graphene oxide or reduced graphene oxide film on the polymeric film;

D. separating the polymeric film coated with the graphene oxide or reduced graphene oxide film from the flat substrate;

E. placing the polymeric film coated with the graphene oxide or reduced graphene oxide film in a support frame;

F. showering of the polymeric film with an organic solvent to dissolve the polymeric film and to obtain a framed graphene oxide or reduced graphene oxide film; and G. separating the graphene oxide or reduced graphene oxide film from the frame to obtain the self-standing graphene oxide or reduced graphene oxide film.

2. The method as recited in claim 1 wherein the graphene oxide, respectively the reduced graphene oxide, is in the form of nanoplatelets with a thickness between 0.9 nm and 10 nm, respectively between 0.3 nm and 5 nm.

3. The method as recited in claim 1 wherein the aqueous dispersion of step A includes 0.5 to 15 g·L$^{-1}$ of graphene oxide or reduced graphene oxide and the wet film of step B has a thickness between 1.0 μm and 2.5 mm.

4. The method as recited in claim 1 wherein the flat substrate is a glass substrate, a metallic substrate, a ceramic substrate or a plastic substrate.

5. The method as recited in claim 1 wherein the polymeric film is chosen from the group consisting of polyacrylates, polyvinyl esters, polyvinyl alcohol, polyurethanes and a mixture thereof.

6. The method as recited in claim 1 wherein the drying of step C is performed at a temperature below 150° C. for 1 to 100 minutes.

7. The method as recited in claim 1 wherein the separation of step D is performed by peeling off the polymeric film coated with the graphene oxide or reduced graphene oxide film from the flat substrate.

8. The method as recited in claim 7 wherein the peeling off is done by wetting the interface between the polymeric film and the substrate.

9. The method as recited in claim 1 wherein the support frame is located on edges of the graphene oxide or reduced graphene oxide film.

10. The method as recited in claim 1 wherein the organic solvent of step F is chosen from the group consisting of acetone, ethanol, isopropanol and a mixture thereof.

11. The method as recited in claim 1 wherein the aqueous dispersion of step A includes graphene oxide and wherein the self-standing graphene oxide film is transparent.

12. The method as recited in claim 1 wherein the self-standing graphene oxide or reduced graphene oxide film has a thickness between 0.7 and 2.5 μm.

13. The method as recited in claim 1 wherein the self-standing graphene oxide or reduced graphene oxide film has a length between 5 and 500 mm and a width between 5 and 500 mm.

14. The method as recited in claim 1 wherein the self-standing graphene oxide or reduced graphene oxide film has an areal density between 0.01 and 20 g·m$^{-2}$.

15. The method as recited in claim 1 further comprising a step H during which the graphene oxide of the self-standing graphene oxide film, respectively the reduced graphene oxide of the self-standing reduced graphene oxide film, is reduced to obtain a self-standing reduced graphene oxide film, respectively further reduced.

* * * * *